United States Patent [19]

Kroner et al.

[11] Patent Number: 5,886,137
[45] Date of Patent: Mar. 23, 1999

[54] PREPARATION OF SALTS OF POLYASPARTIC ACID AND THEIR USE IN DETERGENTS AND CLEANERS

[75] Inventors: Matthias Kroner, Eisenberg; Gunnar Schornick, Neuleiningen; Uwe Strotmann, Frankenthal; Volker Schwendemann, Neustadt; Thomas Meyer, Römerberg; Alfons Ludwig, Höxter, all of Germany

[73] Assignee: BASF Aktiengesellschaft, Ludwigshafen, Germany

[21] Appl. No.: 776,524

[22] PCT Filed: Aug. 16, 1995

[86] PCT No.: PCT/EP95/03224

§ 371 Date: Feb. 27, 1997

§ 102(e) Date: Feb. 27, 1997

[87] PCT Pub. No.: WO96/06879

PCT Pub. Date: Mar. 7, 1996

[30] Foreign Application Priority Data

Aug. 27, 1994 [DE] Germany .................... 44 30 520.6

[51] Int. Cl.⁶ .................... C08G 63/44; C08G 73/00
[52] U.S. Cl. .................... 528/363; 528/288; 528/328; 528/392; 525/418; 525/419; 525/420; 524/599; 524/602; 524/606; 510/501
[58] Field of Search .................... 528/363, 288, 528/328, 392; 525/418, 419, 420; 524/599, 602, 606; 510/501

[56] References Cited

U.S. PATENT DOCUMENTS 5,152,902 10/1992 Koskan et al. .

5,288,783 2/1994 Wood ...................... 525/418

FOREIGN PATENT DOCUMENTS

| 0 220 975 A1 | 9/1986 | European Pat. Off. . |
| 0 581 452 A1 | 7/1993 | European Pat. Off. . |
| WO92/16462 | 10/1992 | WIPO . |
| WO92/16463 | 10/1992 | WIPO . |
| WO93/23452 | 11/1993 | WIPO . |
| WO93/24661 | 12/1993 | WIPO . |
| WO94/01486 | 1/1994 | WIPO . |
| WO94/03526 | 2/1994 | WIPO . |
| WO94/03527 | 2/1994 | WIPO . |

OTHER PUBLICATIONS

Journal Of Medicinal Chemistry, vol. 16, (1973), Synthesis of ∝, β—Poly[(2—hydroxyethyl)—DL——aspartamide], a New Plasma Expander.

*Primary Examiner*—Duc Truong
*Attorney, Agent, or Firm*—Oblon, Spivak, McClelland, Maier & Neustadt, P.C.

[57] ABSTRACT

A process for preparing salts of polyaspartic acid by treating polycondensates in aqueous medium with bases, employing at least 0.7 equivalent of an alkali metal and/or alkaline earth metal base per mole of the aspartimide, aspartic acid and/or aspartamide units present in the polycondensates, and the bases being added within from 30 min to 20 hours to an aqueous suspension of polycondensates of aspartic acid which has been heated to 40°–140° C., and the reaction mixture being allowed to react further where appropriate, and the use of alkali metal and/or alkaline earth metal salts of polyaspartic acids obtainable by treating polycondensates of aspartic acid in aqueous medium with more than 1 equivalent of an alkali metal and/or alkaline earth metal base, with the molecular weight of the polycondensates being reduced, as additive to detergents and cleaners.

3 Claims, No Drawings

PREPARATION OF SALTS OF POLYASPARTIC ACID AND THEIR USE IN DETERGENTS AND CLEANERS

BACKGROUND OF THE INVENTION

1. Field of the Invention

The invention relates to a process for preparing salts of polyaspartic acid by treating polycondensates of aspartic acid in aqueous medium with bases, employing at least 0.7 equivalent of an alkali metal and/or alkaline earth metal base per mole of the aspartimide, aspartic acid and/or aspartamide units present in the polycondensates, and to their use in detergents and cleaners.

2. Discussion of the Background

Thermal polycondensation of aspartic acid at temperatures above 190° C. results in polycondensates which essentially comprise aspartimide units. Journal of Medicinal Chemistry, 16, (1973) 893–897 discloses the condensation of aspartic acid in the presence of phosphoric acid as catalyst. WO-A-93/24661 discloses that acids such as phosphoric acid, phosphorous acid, hypophosphorus acid, hydrochloric acid or sulfuric acid, and sodium bisulfate or potassium bisulfate, catalyze the polycondensation of aspartic acid at temperatures above about 150° C. The polycondensates obtainable in this way predominantly comprise aspartimide units and may, depending on the temperature at which the polycondensation was carried out, comprise aspartic acid, aspartamide and aspartimide units. Treatment of polycondensates of aspartic acid with alkali metal bases, e.g. sodium hydroxide solution, results in the corresponding salts of polyaspartic acids.

Polyaspartimides can also be prepared by addition of ammonia onto maleic acid and condensation. Hydrolysis and neutralization of the polyaspartimides with sodium hydroxide solution results in the sodium salts of polyaspartic acids. Up to 1 mol of sodium hydroxide solution is employed per mole of aspartimide unit in the polycondensates. Processes of this type are disclosed, for example, in WO-A-93/23452, WO-A-94/3526, WO-A-94/3527 and DE-A-36 62 672. The preparation of alkali metal salts of polyaspartic acids is disclosed in WO-A-92/16462, WO-A-92/16463 and U.S. Pat. No. 5,152,902, wherein the polyaspartimide obtainable by condensing aspartic acid is suspended in water and, while monitoring the pH, sodium hydroxide solution is metered in so that the pH does not exceed 9.5. pH measurement in industrial apparatus is inadvisable where the viscosities are high and the solids contents of the mixtures to be hydrolyzed are high, because pH electrodes usually do not display accurate values because of the delay in mixing.

EP-A-0 581 452 discloses the preparation of sodium salts of polyaspartic acid by adding sodium hydroxide solution dropwise to an aqueous suspension of polyaspartimide which has been heated to 50°–60° C. in such a way that the pH of the reaction mixture does not exceed 10. After the addition of sodium hydroxide solution, the reaction mixture is kept at 50°–60° C. for 1 hour more. About 83% of the amount of sodium hydroxide solution necessary for complete neutralization is employed.

Alkaline hydrolysis and neutralization of polysuccinimides and polyaspartic acids is a highly exothermic process which must be reliably controlled when the process is carried out on the industrial scale in order to ensure straightforward operation and uniform product quality.

SUMMARY OF THE INVENTION

It is an object of the present invention to provide a process for preparing salts of polycondensates of aspartic acid resulting in products with better biodegradability than in the prior art.

We have found that this object is achieved by a process for preparing salts of polyaspartic acid by treating polycondensates of aspartic acid in aqueous medium with bases when more than 1 equivalent of an alkali metal and/or alkaline earth metal base per mole of the aspartimide, aspartic acid and/or aspartamide units present in the polycondensates, and the condensates undergo partial hydrolytic degradation, the bases being added within from 30 min to 20 hours to an aqueous suspension of polycondensates of aspartic acid which has been heated to 40°–140° C., and the reaction mixture being allowed to react further where appropriate.

DETAILED DESCRIPTION OF THE PREFERRED EMBODIMENT

The polycondensates of aspartic acid can be prepared by all known processes. Depending on the preparation method, the polycondensate consists of aspartic acid units or predominantly comprises aspartic acid units, or the condensate comprises, exclusively or predominantly, aspartimide units. It may also comprise aspartamide units. Polycondensation of aspartic acid can take place, for example, at temperatures of at least 190° C. in the form of a polycondensation of solids. Other preparation processes are polycondensation of ammonium fumarate or ammonium maleate at temperatures above 120° C., polycondensation of maleamic acid or the ammonium salt of maleamic acid at temperatures above 140° C. without diluent or mixed with polyalkylene glycols, or polycondensation of aspartic acid with phosphoric acid or other acids at temperatures above 140° C. Examples of other acids which are suitable are alkylbenzenesulfonic acid, benzenesulfonic acid, sulfuric acid, ammonium bisulfate, potassium bisulfate, sodium bisulfate, mixtures of potassium and sodium bisulfates, hydrochloric acid, phosphorous acid and hypophosphorous acid. The molecular weights of the polycondensates of aspartic acid can be as desired. The molecular weights $M_w$ are preferably from 800 to 300,000.

Suitable bases for the process according to the invention are alkali metal and/or alkaline earth metal bases. By this are meant the hydroxides, oxides, carbonates or bicarbonates of alkali metals or alkaline earth metals. Examples thereof are sodium hydroxide, potassium hydroxide, sodium carbonate, potassium carbonate, sodium bicarbonate, potassium bicarbonate, magnesium oxide, magnesium hydroxide, calcium oxide, calcium hydroxide, barium oxide and barium hydroxide. Sodium hydroxide solution or sodium carbonate is preferably used as base. The bases can be employed in the process according to the invention in the form of the solids, of aqueous solutions in water or suspensions in water.

The bases are employed in an amount such that at least 0.7 equivalent of an alkali metal and/or alkaline earth metal base is used per mole of the units derived from aspartic acid, such as aspartimide, aspartic acid and aspartamide units, present in the polycondensates. In most cases, the amounts of base are at least 0.8 mol/mol of units derived from aspartic acid in the polycondensates of aspartic acid. If polyaspartimide or polyaspartic acid is introduced into water and hydrolyzed with up to 1.0 mol of alkali or a mole equivalent of an alkaline earth metal base, or if polyaspartimide or polyaspartic acid is simultaneously mixed with up to 1 mol of alkalis in a continuous mixer, the aspartimide units are hydrolyzed to form α- and β-linked aspartic acid units which are present as aqueous solution in the alkali form. This fact can be depicted diagrammatically for polysuccinimide in the following way, for example:

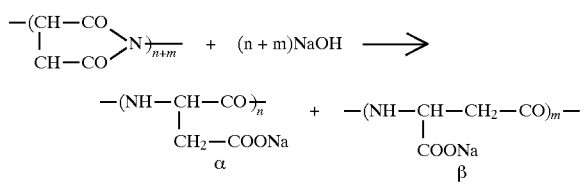

If more than 1 mol of an alkali metal base or an equivalent of an alkaline earth metal base is employed per mole of aspartimide units in polycondensates of aspartic acid in the process according to the invention, the molecular weight of the polycondensates is reduced, with main polypeptide chains being hydrolytically cleaved. The molecular weight of polycondensates of aspartic acid is reduced especially when preferably 1.05–1.5 mol of an alkali metal base or corresponding amounts of mole equivalents of an alkaline earth metal base are employed per mole of units derived from aspartic acid present in the polycondensates. The reduction in molecular weight results in low molecular weight salts of polyaspartic acids. When there is partial hydrolytic degradation of the polycondensates, the molecular weight of the polycondensates is reduced, for example, by from 5 to 95%, usually by from 10 to 85 and, preferably, by from 20 to 70%. If more than 1.5 mol of alkali, e.g. 1.55 to 2.0 mol of alkali, based on 1 mol of aspartimide units in the polycondensate, are employed in the treatment of polyaspartimides, the proportion of aspartic acid units in the polycondensates decreases, and monomeric aspartic acid in the form of the sodium salt is increasingly produced. This fact can be described, for example, by means of the following diagram:

(a) for α-, α-linked aspartic acid units:

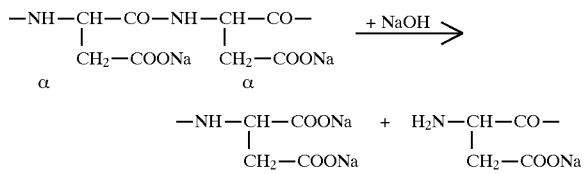

(b) for β-, β-linked aspartic acid units:

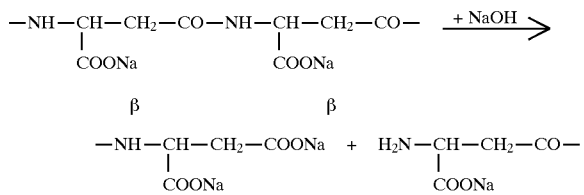

(c) for α-, β- linked aspartic acid units:

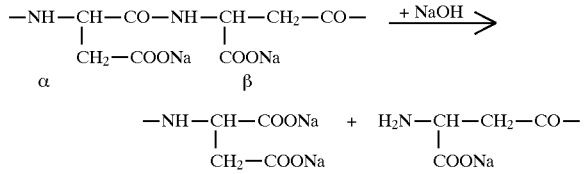

Hydrolysis of polycondensates of aspartic acid with more than 1 mole equivalent of an alkali metal and/or alkaline earth metal base, in particular with 1.05 to 1.5 mole equivalents of a base, is of particular interest because the neutralized polyaspartic acids resulting in these cases have an improved biodegradability by comparison with polyaspartic acid salts which have been hydrolyzed and neutralized with a substoichiometric amount of base. Polycondensation of aspartic acid results in polymeric by-products of low biodegradability, depending on the polycondensation process. Hydrolysis with more than 1 mol of alkali metal base or more than 1 mole equivalent of an alkaline earth metal base results in the polymeric by-products being converted into open-chain aspartyl peptides which are more amenable to biodegradation than are the unhydrolyzed ones. The poorly degradable polymeric by products which are present in greater or lesser amounts in the polycondensates of aspartic acid are not opened by the alkaline hydrolysis conventional in the prior art. In the unopened form, the by-products present are not biodegradable. On use of more than 1 mole equivalent of an alkali metal and/or alkaline earth metal base per mole of aspartic acid units in the polycondensates there is simultaneous hydrolysis of peptide linkages in the main polycondensate chain. This results in a reduction of the molecular weight of the polyaspartic acids.

The improvement in the biodegradability of polyaspartic acids by hydrolyzing polyaspartimides with more than 1 mole equivalent of an alkali metal and/or alkaline earth metal base per mole of the aspartimide units present in the condensates can be measured by all known methods. Test methods are described, for example, by Wagner, Methoden zur Prüfung der biochemischen Abbaubarkeit chemischer Substanzen, VCH Verlagsanstalt Weinheim, 1988. Examples of suitable methods are the Zahn-Wellens test, the DOC die-away test, the Sturm test and the closed bottle test.

Polycondensates of aspartic acid can be treated with bases in a variety of ways. The amount of alkali metal and/or alkaline earth metal base to be employed according to the invention can be added within from 30 min to 20 hours, preferably 1 to 15 hours, continuously or in a plurality of small portions. The polycondensates of aspartic acid can be, for example, suspended in water and, at temperatures below 40° C., from 0 to 70% of the required amount of base can be added until a solution of polyaspartic acid salts results. This preliminary hydrolysis can take place, for example, within from 30 min up to several hours. The remaining amount of alkali, e.g. from 70 to 100% of the total amount necessary, is then metered in within from 30 min to 20 hours, in the temperature range from 40° to 140° C. A 10–50% by weight aqueous solution of alkali metal hydroxides is preferably used for hydrolyzing the polycondensates of aspartic acid. A particularly preferred procedure is one in which from 1.05 to 1.5 mol of sodium hydroxide solution are employed per mole of aspartimide, aspartic acid and/or aspartamide units present in the condensates. The hydrolysis can be carried out batchwise or else continuously by, for example, introducing sodium hydroxide solution and polyaspartimide simultaneously into a sodium polyaspartate solution. The treatment of the polycondensates of aspartic acid with the bases is carried out at from 40° to 140°, preferably 50° to 100° C. At temperatures above 100° C., the polycondensates of aspartic acid are treated in apparatus which is closed pressure-tight, e.g. in a stirred autoclave. The alkaline hydrolysis takes place particularly rapidly at temperatures in the range 120°–140° C.

The salts of polyaspartic acid obtainable by the process according to the invention have, as a 1% strength aqueous solution in the sodium form at pH 7 and 25° C., Fikentscher K values of from 7 to 100, preferably 8 to 80, corresponding to molecular weights $M_w$ of 156–150,000, preferably 500–100,000. The molecular weights are checked by gel permeation chromatography using calibrated polyacrylic acid standards.

The salts of polyaspartic acid, and preferably the alkali metal and alkaline earth metal salts of degraded polyaspartic acids obtainable by hydrolytic cleavage of peptide linkages in polysuccinimides or in salts of polyaspartic acids are used as additive to phosphate-free or reduced-phosphate detergents and cleaners. Reduced-phosphate detergents have a phosphate content, calculated as Na triphosphate, not exceeding 25% by weight. The degraded polyaspartic acids and their salts have a surprisingly higher biodegradability than undegraded polyaspartic acid salts. They act as encrustation inhibitors in textile detergents. The salts of degraded polyaspartic acids are employed, for example, in amounts of from 1 to 10% by weight in detergents and cleaners, based on the formulations. On treatment of the polycondensates of aspartic acid with more than 1 mole equivalent of a base, the reduction in molecular weight of the polycondensates is, for example, from 5 to 95% based on the molecular weight of the polycondensates employed.

The detergents may be in powdered form or else in liquid formulation. The detergent and cleaner formulations may differ widely in composition. Detergent and cleaner formulations normally contain from 2 to 50% by weight of surfactants, with or without builders. These data apply both to liquid and to powder detergents. Detergent and cleaner formulations customary in Europe, the USA and Japan are tabulated, for example, in Chemical and Engn. News, 67, (1989) 35. Further details of the composition of detergents and cleaners can be found in Ullmanns Encyklopädie der technischen Chemie, Verlag Chemie, Weinheim 1983, 4th Edition, pages 63–160. The detergents may also, where appropriate, contain a bleach, e.g. sodium perborate, which may be present in the detergent formulation, if used, in amounts of up to 30% by weight. The detergents and cleaners may, where appropriate, contain other conventional additives, e.g. complexing agents, opacifying agents, optical brighteners, enzymes, perfume oils, color transfer inhibitors, antiredeposition agents and/or bleach activators.

The percentages in the examples are % by weight. The K values were determined by the method of H. Fikentscher, Cellulose-Chemie, 13, (1932) 58–64 and 72–74 in aqueous solution at 25° C. with a concentration of 1% by weight of the sodium salt of the polyaspartic acids at pH 7.

EXAMPLES

Preparation of polycondensates of aspartic acid

Polyaspartimide 1

50 kg of aspartic acid are introduced into a tumble drier with a capacity of 200 l and, while passing through a stream of nitrogen (500 l/h), polycondensed, with the heat-transfer oil at 220° C. for 6 hours, until 95% of the theoretically possible amount of water has formed. The reactor is then cooled, and the polycondensate is used without further purification for the hydrolysis. The molecular weight $M_w$ is 6000.

Polyaspartimide 2

A continuously operating kneader with a capacity of 2 l is preheated to 250° C. Then 2 kg/h maleamic acid are metered at a constant rate from a solids metering unit, while simultaneously passing nitrogen through, into the reactor, and the resulting water and small amounts of ammonia are distilled off. The polyaspartimide emerges from the reactor outlet as a powder in the form of a reddish foam. The polyaspartimide preparation is complete after a polymerization time of 6 hours. The resulting polycondensate is employed without further purification for hydrolysis tests. The molecular weight $M_w$ is 3000.

Polyaspartimide 3

133.2 kg of L-aspartic acid and 326.7 kg of 75% strength phosphoric acid are introduced into a reactor which has a capacity of 1000 l and is equipped with an anchor agitator, and the mixture is stirred at 100° C. until the aspartic acid has dissolved. The time required for this is about 3 to 4 hours. Subsequently, the pressure in the reactor is reduced to 100 mbar, and 92 l of water are distilled out. The temperature is then raised to 160° C., and the reaction mixture is polycondensed under 50 mbar for 20 hours. 36 l of water have formed after this time. The reaction mixture is then discharged into a reactor containing 500 l of water, resulting in a suspension which is stirred for 2 hours. The polycondensate is filtered off and washed with water until the filtrate has a pH of 4. The polycondensate is employed moist for the hydrolysis tests. It has a water content of 66.7%. The molecular weight $M_w$ is 10,000.

Example 1

68 kg of polyaspartimide 3 with a water content of 66.7% are introduced into a stirred vessel with a capacity of 160 l, and 10 l of water are added to result in a stirrable paste. Then 17.8 kg of 50% strength aqueous sodium hydroxide solution (94% of the amount necessary for 100% neutralization) are metered by a pump at a constant rate into the reactor over the course of 4 hours. The hydrolysis solution is maintained at 80° C. during this. After the addition is complete, the reaction mixture is stirred at 80° C. until a clear solution has formed. The pH of the aqueous polymer solution is then adjusted to 7.3 by adding small amounts of sodium hydroxide solution. The K value of the polyaspartic acid in the form of the sodium salt is 24.1, which corresponds to a molecular weight $M_w$ of 5000.

Example 2

68 kg of polyaspartimide 3 with a water content of 66.7% and 240 l of water are introduced into a stirred vessel with a capacity of 500 l. 65 kg of 25% strength aqueous sodium hydroxide solution are metered into this suspension at a temperature not exceeding 35° C. over the course of 2 hours. The mixture is then stirred at 20° C. for 10 hours. The temperature is subsequently raised to 60° C. After 4 hours, 43 kg of 25% strength aqueous sodium hydroxide solution are added over the course of 6 hours, and the reaction mixture is stirred at 60° C. for 16 hours. The total amount of sodium hydroxide solution employed is 100.6% of theory, i.e. based on polyaspartic acid. The solution has a pH of 7.3 and a solids content of 22% by weight. The K value of the polycondensate is 32.4, which corresponds to a molecular weight $M_w$ of 9000.

Example 3

34 kg of polyaspartimide 1 and 45 kg of water are introduced into a reactor which has a capacity of 100 l and is equipped with an anchor agitator, and are heated to 40° C. and, at this temperature, 24.5 kg of 50% strength aqueous sodium hydroxide solution (87% of theory) are added over the course of 4 hours. After addition of the sodium hydroxide solution, the reaction mixture is stirred for 10 hours to complete the hydrolysis. The pH of the solution is then adjusted to 7.7. The solution has a solids content of 47%. The K value of the sodium salt of the polyaspartic acid is 20.4, which corresponds to a molecular weight $M_w$ of 4000.

Example 4

10 kg of polyaspartimide 2 and 14 kg of water are introduced into a reactor which has a capacity of 50 l and is equipped with an anchor agitator, and are heated to 40° C. and, at this temperature, 6.4 kg of a 50% strength aqueous sodium hydroxide solution (78% of theory) are added at a constant rate over the course of 4 hours. The temperature is then raised to 80° C., and the reaction mixture is stirred at this temperature for 10 hours and then cooled. The pH of the solution is then adjusted to 8. The aqueous solution has a solids content of 45%. The K value of the sodium salt of the polyaspartic acid is 15.5, which corresponds to a molecular weight $M_w$ of 3000.

Examples 5–18

98 g (1 mol) of the polyaspartimides indicated in Table 1 are each suspended in 200 ml of water at the temperature likewise indicated in Table 1, in the amounts of 50% strength aqueous sodium hydroxide solution indicated in Table 1 are added over the course of 60 min. The hydrolysis is then continued for the time likewise indicated in each case in Table 1, and is then stopped by adding hydrochloric acid to a pH of 7. The K values and the molecular weights $M_w$ are indicated in Table 1.

TABLE 1

| Ex. | Polyaspart-imide | NaOH [mol] | Temp [°C.] | Time [h] | K-value | Mw |
|---|---|---|---|---|---|---|
| 5 | 2 | 1.1 | 60 | 6 | 11.3 | 1500 |
| 6 | 2 | 1.2 | 60 | 6 | 9.7 | 800 |
| 7 | 2 | 1.5 | 60 | 6 | 6.7 | 500 |
| 8 | 2 | 2.0 | 60 | 6 | 5.6 | below 400 |
| 9 | 1 | 1.1 | 100 | 4 | 15.7 | 2890 |
| 10 | 1 | 1.1 | 100 | 8 | 15.1 | 2870 |
| 11 | 1 | 1.1 | 100 | 16 | 15.3 | 2800 |
| 12 | 1 | 1.1 | 100 | 32 | 10.1 | 2690 |
| 13 | 3 | 1.0 | 100 | 5 | 28.9 | 8000 |
| 14 | 3 | 1.1 | 100 | 8 | 15.1 | 2780 |
| 15 | 3 | 1.1 | 100 | 5 | 14.8 | 2500 |
| 16 | 3 | 1.2 | 100 | 5 | 10.7 | 1500 |
| 17 | 3 | 1.5 | 100 | 5 | 8.5 | 1000 |
| 18 | 3 | 2.0 | 100 | 5 | 7,4 | 500 |

Examples 19–24

In each case 98 g (1 mol) of the polyaspartimides indicated in Table 2 are suspended in 120 ml of water, the suspension is heated to 60° C., and the amounts of 50% strength aqueous sodium hydroxide solution indicated in Table 2 are added over the course of 60 min. The reaction mixture is then refluxed in each case for 5 hours and subsequently adjusted to pH 7 by adding hydrochloric acid. The K values of the sodium salts of the polyaspartic acids are indicated in Table 2.

TABLE 2

| Example | Polyaspartimide | NaOH | K value |
|---|---|---|---|
| 19 | 3 | 0.8 mol | 32.4 |
| 20 | 3 | 1.0 mol | 24.2 |
| 21 | 3 | 1.2 mol | 10.7 |
| 22 | 2 | 0.8 mol | 11.1 |
| 23 | 2 | 1.0 mol | 12.7 |
| 24 | 2 | 1.2 mol | 9.4 |

Examples 25–28

98 g (1 mol) of the polyaspartimides indicated in Table 3 are each suspended in 200 ml of water at 50° C., and 25% strength aqueous sodium hydroxide solution is added in 1 ml portions over the course of 8 hours. During the addition of sodium hydroxide solution, the polyaspartimide dissolves to give a clear solution.

TABLE 3

| Example | NaOH [mol] | Polyaspartimide | K value | $M_w$ |
|---|---|---|---|---|
| 25 | 0.7 | 2 | 15 | 3000 |
| 26 | 1.0 | 2 | 13 | 1800 |
| 27 | 0.7 | 1 | 26 | 6000 |
| 28 | 0.7 | 3 | 32 | 10,000 |

Example 29

194 g of polyaspartimide 1 are suspended in 200 g of water at 40° C. in a beaker with a capacity of 1 l, and a total of 58 g (100% of the theoretical amount) of solid magnesium hydroxide are added in small portions over the course of 2 hours. The reaction mixture is then stirred at 40° C. for 3 hours until a clear solution has been produced. The pH of the solution is 7.5. The solids content of the solution is adjusted to 24% by dilution with water. The K value of the polycondensate is 12.7, corresponding to a molecular weight $M_w$ of 2000.

Example 30

194 g of polyaspartimide 1 are suspended in 200 g of water at 40° C. in a beaker with a capacity of 1 l, and 24 g of solid calcium hydroxide (100% of the calculated amount) are added over the course of 2 hours. The calcium salt separates out of the solution as a pasty mass in the form of a concentration precipitate. A sample of about 1 g of the calcium salt is removed from the reaction mixture and mixed with 30 ml of water. This results in a clear solution. Subsequently 1 l of ethanol is added to the hydrolyzed mixture, and the precipitated calcium salt is filtered off with suction. After washing with 200 ml of ethanol, the calcium salt is dried to a powder in an oven at 60° C.

Example 31

194 g of polyaspartimide 1 are suspended in 200 g of water at 20° C. in a beaker with a capacity of 1 l, and 22.4 g of 50% strength potassium hydroxide solution (100% of the theoretical amount) are added at 50° C. over the course of 2 hours. The solution obtainable in this way has a solids content of 44%. The K value of the polycondensate is 25, corresponding to a molecular weight $M_w$ of 5500.

Determination of the biodegradability of the hydrolyzed polyaspartimides.

Some of the sodium salts of polyaspartic acids prepared by the process according to the invention were investigated for biodegradability in the Zahn-Wellens test described in OECD 302 B. The decrease in dissolved organic carbon (DOC die-away) is indicated in Table 4.

TABLE 4

| Ecological test No. | Na polyaspartate prepared in Example | Decrease in dissolved organ. carbon in the test solution in the Zahn-Wellens test after 28 days [%] |
|---|---|---|
| 1 | 9 | 85 |
| 2 | 27 | 48 |
| 3 | 14 | 95 |
| 4 | 28 | 80 |
| 5 | 5 | 79 |
| 6 | 25 | 41 |

As is evident from the results in Table 4, the biodegradability of sodium polyaspartates is unexpectedly increased when more than 1 mol of sodium hydroxide solution is used to hydrolyze the polyaspartimide.

Some of the hydrolysates prepared by the process according to the invention were investigated in the die-away test (DOC die-away test/Method C.4-A) in the annex to EC Directive 92/69/EC of Jul. 31, 1992). This is a test for ease of biodegradability. In addition, the $CO_2$ test and Zahn-Wellens test were carried out.

1. DOC die-away test

| Na polyaspartate obtained in Example | Degradability after | |
|---|---|---|
| | 10 days | 28 days |
| a 19 | 50% | 70% |
| b 20 | 42% | 85% |
| c 21 | >90% | >90% |
| d 22 | 40% | 50% |
| e 23 | 50% | 63% |
| f 24 | 68% | 75% |

2. $CO_2$ test

| Na polyaspartate obtained in Example | Degradability after | |
|---|---|---|
| | 10 days | 28 days |
| a 19 | 32% | 52% |
| b 20 | 22% | 67% |
| c 21 | 60% | 90% |
| d 22 | 25% | 45% |
| e 23 | 32% | 52% |
| f 24 | 50% | 70% |

The result of the ecological investigations is that the biodegradability increases with the degree of hydrolysis. The polyaspartic acids prepared by hydrolysis of polyaspartimides with 1 mol or more of sodium hydroxide solution per mole of polyaspartimide have particularly good degradability.

3. DOC die-away in the Zahn-Wellens test

| Na polyaspartate obtained in Example | DOC die-away [%] in the Zahn-Wellens test after | |
|---|---|---|
| | 3 days | 10 days |
| 19 | 10 | 92 |
| 14 | 15 | 94 |
| 16 | 35 | 95 |
| 17 | 76 | 95 |
| 18 | 95 | 95 |
| 22 | 25 | 70 |
| 13 | 26 | 72 |
| 16 | 33 | 80 |
| 17 | 62 | 82 |
| 18 | 82 | 88 |
| 27 | 10 | 50 |
| 9 | 10 | 82 |

We claim:

1. A process for preparing salts of polyaspartic acid by treating polycondensates of aspartic acid in aqueous medium with bases, wherein from 1.05 to 1.5 mol of sodium hydroxide solution are employed per mole of aspartimide, aspartic acid or aspartamide units, or mixture thereof, present in the condensates, and the condensates undergo partial hydrolytic degradation, the bases being added within from 30 minutes to 20 hours to an aqueous suspension of polycondensates of aspartic acid which has been heated to 40°–140° C., and the reaction mixture being optionally allowed to react further.

2. A detergent or cleaner which comprises from 1 to 10% by weight of alkali metal or alkaline earth metal salts of polyaspartic acids, or a mixture thereof, obtained by treating polycondensates of aspartic acid in aqueous medium with more than 1 equivalent of an alkali metal or alkaline earth metal base, or mixture thereof, per mole of aspartimide, aspartic or aspartamide units, or mixture thereof, present in the polycondensates, with the molecular weight of the polycondensates being reduced.

3. The detergent or cleaner of claim 2, wherein from 1.05 to 1.5 mol of sodium hydroxide solution are employed per mole of aspartimide, aspartic acid or aspartamide units, or mixture thereof, present in the condensates.

* * * * *